United States Patent
White et al.

(10) Patent No.: US 8,397,262 B2
(45) Date of Patent: Mar. 12, 2013

(54) SYSTEMS AND METHODS FOR GRAPHICAL CONTROL OF USER INTERFACE FEATURES IN A TELEVISION RECEIVER

(75) Inventors: James Matthew White, Denver, CO (US); Luke Vanduyn, Highlands Ranch, CO (US); Matthew Coburn, Denver, CO (US); Karen Michelle Taxier, Highlands Ranch, CO (US); Daniel L. Rudolph, Castle Rock, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 236 days.

(21) Appl. No.: 12/241,599

(22) Filed: Sep. 30, 2008

(65) Prior Publication Data

US 2010/0083312 A1 Apr. 1, 2010

(51) Int. Cl.
*H04N 5/445* (2011.01)
(52) U.S. Cl. .................. 725/47; 725/1; 725/63
(58) Field of Classification Search .......... 725/47; 715/769, 810
See application file for complete search history.

(56) References Cited

U.S. PATENT DOCUMENTS

| | | | |
|---|---|---|---|
| 4,450,477 A * | 5/1984 | Lovett | 725/93 |
| 4,725,888 A | 2/1988 | Hakamada | |
| 4,739,510 A | 4/1988 | Jeffers et al. | |
| 4,852,019 A | 7/1989 | Vinberg et al. | |
| 4,868,785 A | 9/1989 | Jordan et al. | |
| 5,187,776 A | 2/1993 | Yanker | |
| 5,260,778 A | 11/1993 | Kauffman et al. | |
| 5,428,734 A | 6/1995 | Haynes et al. | |
| 5,438,372 A | 8/1995 | Tsumori et al. | |
| 5,450,536 A | 9/1995 | Rosenberg et al. | |
| 5,453,796 A | 9/1995 | Duffield et al. | |
| 5,539,478 A | 7/1996 | Bertram et al. | |
| 5,539,479 A | 7/1996 | Bertram | |
| 5,545,857 A | 8/1996 | Lee et al. | |
| 5,548,340 A | 8/1996 | Bertram | |
| 5,559,961 A | 9/1996 | Blonder | |
| 5,585,866 A * | 12/1996 | Miller et al. | 725/43 |
| 5,589,893 A | 12/1996 | Gaughan et al. | |
| 5,594,469 A | 1/1997 | Freeman et al. | |

(Continued)

FOREIGN PATENT DOCUMENTS

| | | |
|---|---|---|
| EP | 1063797 A2 | 12/2000 |
| EP | 1158793 A2 | 11/2001 |

(Continued)

OTHER PUBLICATIONS

Wikipedia, the free encyclopedia, "Dashboard (Software)," Retrieved from the Internet on Oct. 6, 2008, http://en.wikipedia.org/w/index.php?title=Dashboard_(software)&printable=yes.

(Continued)

*Primary Examiner* — Nicholas Corbo
(74) *Attorney, Agent, or Firm* — Ingrassia Fisher & Lorenz, P.C.

(57) ABSTRACT

Systems and methods provide for graphically providing features on a set top box (STB) or other television receiver in response to viewer instructions received from a remote control. Imagery including various tiles each corresponding to one of the provided features is presented on the display. A two-dimensional input is received from the remote control that indicates a selected one of the plurality of tiles, and, in response to the received two-dimensional input, the feature associated with the selected tile is provided.

20 Claims, 4 Drawing Sheets

U.S. PATENT DOCUMENTS

| | | |
|---|---|---|
| 5,594,509 A | 1/1997 | Florin et al. |
| 5,602,597 A * | 2/1997 | Bertram .................... 725/56 |
| 5,604,544 A | 2/1997 | Bertram |
| 5,606,374 A | 2/1997 | Bertram |
| 5,650,827 A | 7/1997 | Tsumori et al. |
| 5,652,630 A | 7/1997 | Bertram et al. |
| 5,659,369 A | 8/1997 | Imaiida |
| 5,677,708 A | 10/1997 | Matthews, III et al. |
| 5,682,489 A | 10/1997 | Harrow et al. |
| 5,721,815 A | 2/1998 | Ottesen et al. |
| 5,721,878 A | 2/1998 | Ottesen et al. |
| 5,742,286 A | 4/1998 | Kung et al. |
| 5,751,883 A | 5/1998 | Ottesen et al. |
| 5,754,258 A | 5/1998 | Hanaya et al. |
| 5,767,840 A | 6/1998 | Selker |
| 5,768,158 A | 6/1998 | Adler et al. |
| 5,774,186 A | 6/1998 | Brodsky et al. |
| 5,786,805 A | 7/1998 | Barry |
| 5,801,747 A | 9/1998 | Bedard |
| 5,805,235 A | 9/1998 | Bedard |
| 5,809,265 A | 9/1998 | Blair et al. |
| 5,815,216 A | 9/1998 | Suh |
| 5,825,361 A | 10/1998 | Rubin et al. |
| 5,831,591 A | 11/1998 | Suh |
| 5,831,607 A | 11/1998 | Brooks |
| 5,867,162 A | 2/1999 | O'Leary et al. |
| 5,874,953 A | 2/1999 | Webster et al. |
| 5,898,431 A | 4/1999 | Webster et al. |
| 5,905,496 A | 5/1999 | Lau et al. |
| 5,917,488 A | 6/1999 | Anderson et al. |
| 5,917,489 A | 6/1999 | Thurlow et al. |
| 5,936,623 A | 8/1999 | Amro |
| 5,949,417 A | 9/1999 | Calder |
| 5,956,025 A | 9/1999 | Goulden et al. |
| 5,966,121 A | 10/1999 | Hubbell et al. |
| 5,978,043 A * | 11/1999 | Blonstein et al. .............. 348/569 |
| 5,999,228 A * | 12/1999 | Matsuura et al. ............. 348/569 |
| 6,005,565 A | 12/1999 | Legall |
| 6,008,735 A | 12/1999 | Chiloyan et al. |
| 6,008,860 A | 12/1999 | Patton et al. |
| 6,018,342 A | 1/2000 | Bristor |
| 6,020,930 A * | 2/2000 | Legrand ..................... 725/41 |
| 6,052,121 A | 4/2000 | Webster et al. |
| 6,057,841 A | 5/2000 | Thurlow et al. |
| 6,064,376 A | 5/2000 | Berezowski et al. |
| 6,078,308 A | 6/2000 | Rosenberg et al. |
| 6,088,029 A | 7/2000 | Guiberson et al. |
| 6,118,442 A | 9/2000 | Tanigawa |
| 6,118,498 A | 9/2000 | Reitmeier |
| 6,125,374 A | 9/2000 | Terry et al. |
| 6,141,003 A | 10/2000 | Chor et al. |
| 6,147,714 A | 11/2000 | Terasawa et al. |
| 6,173,112 B1 | 1/2001 | Gruse et al. |
| 6,191,773 B1 | 2/2001 | Maruno et al. |
| 6,208,341 B1 | 3/2001 | van Ee et al. |
| 6,208,804 B1 | 3/2001 | Ottesen et al. |
| 6,215,417 B1 | 4/2001 | Krass et al. |
| 6,233,389 B1 | 5/2001 | Barton et al. |
| 6,266,098 B1 | 7/2001 | Cove et al. |
| 6,281,940 B1 | 8/2001 | Sciammarella |
| 6,334,217 B1 | 12/2001 | Kim |
| 6,493,036 B1 | 12/2002 | Fernandez |
| 6,498,628 B2 | 12/2002 | Iwamura |
| 6,526,577 B1 | 2/2003 | Knudson et al. |
| 6,529,685 B2 | 3/2003 | Ottesen et al. |
| 6,556,252 B1 | 4/2003 | Kim |
| 6,650,248 B1 | 11/2003 | O'Donnell et al. |
| 6,678,009 B2 | 1/2004 | Kahn |
| 6,697,123 B2 | 2/2004 | Janevski et al. |
| 6,750,803 B2 | 6/2004 | Yates et al. |
| 6,750,887 B1 | 6/2004 | Kellerman et al. |
| 6,774,914 B1 | 8/2004 | Benayoun |
| 6,804,824 B1 | 10/2004 | Potrebic et al. |
| 6,816,442 B1 | 11/2004 | Heiman et al. |
| 6,822,698 B2 | 11/2004 | Clapper |
| 6,882,712 B1 | 4/2005 | Iggulden et al. |
| 6,934,963 B1 | 8/2005 | Reynolds et al. |
| 6,943,845 B2 | 9/2005 | Mizutome et al. |
| 7,046,161 B2 | 5/2006 | Hayes |
| 7,061,544 B1 | 6/2006 | Nonomura et al. |
| 7,148,909 B2 | 12/2006 | Yui et al. |
| 7,171,622 B2 | 1/2007 | Bhogal |
| 7,196,733 B2 | 3/2007 | Aratani et al. |
| 7,206,029 B2 | 4/2007 | Cohen-Solal |
| 7,225,456 B2 | 5/2007 | Kitsukawa et al. |
| 7,231,603 B2 | 6/2007 | Matsumoto |
| 7,268,830 B2 | 9/2007 | Lee |
| 7,370,284 B2 | 5/2008 | Andrea et al. |
| 7,420,620 B2 | 9/2008 | Habas et al. |
| 7,434,246 B2 | 10/2008 | Florence |
| 7,440,036 B2 | 10/2008 | Onomatsu et al. |
| 7,584,492 B2 | 9/2009 | Terakado et al. |
| 7,600,201 B2 | 10/2009 | Endler et al. |
| 7,636,131 B2 | 12/2009 | Hsieh et al. |
| 7,707,599 B1 | 4/2010 | Groff et al. |
| 7,746,332 B2 | 6/2010 | Le Leannec et al. |
| 7,876,382 B2 | 1/2011 | Imaizumi |
| 7,880,813 B2 | 2/2011 | Nakamura et al. |
| 8,001,566 B2 | 8/2011 | Jang |
| 8,005,826 B1 | 8/2011 | Sahami et al. |
| 8,239,784 B2 | 8/2012 | Hotelling et al. |
| 2001/0011953 A1 | 8/2001 | Shintani et al. |
| 2001/0017672 A1 | 8/2001 | Verhaeghe |
| 2002/0054062 A1 | 5/2002 | Gerba et al. |
| 2002/0057382 A1 | 5/2002 | Yui |
| 2002/0060754 A1 | 5/2002 | Takeuchi |
| 2002/0070957 A1 | 6/2002 | Trajkovic et al. |
| 2002/0075333 A1 | 6/2002 | Dutta et al. |
| 2002/0075407 A1 | 6/2002 | Cohen-Solal |
| 2002/0097229 A1 | 7/2002 | Rose et al. |
| 2002/0122027 A1 | 9/2002 | Kim |
| 2002/0122079 A1 | 9/2002 | Kamen et al. |
| 2002/0178446 A1 | 11/2002 | Sie et al. |
| 2002/0188948 A1 | 12/2002 | Florence |
| 2002/0191954 A1 | 12/2002 | Beach |
| 2003/0001908 A1 | 1/2003 | Cohen-solal |
| 2003/0005443 A1 | 1/2003 | Axelsson et al. |
| 2003/0005445 A1 | 1/2003 | Schein et al. |
| 2003/0018973 A1 | 1/2003 | Thompson |
| 2003/0025716 A1 | 2/2003 | Colavin |
| 2003/0066079 A1 | 4/2003 | Suga |
| 2003/0086694 A1 | 5/2003 | Davissson |
| 2003/0115589 A1 | 6/2003 | D'Souza et al. |
| 2003/0126607 A1 | 7/2003 | Phillips et al. |
| 2003/0131356 A1 | 7/2003 | Proehl et al. |
| 2003/0191947 A1 | 10/2003 | Stubblefield et al. |
| 2003/0193426 A1 | 10/2003 | Vidal |
| 2003/0208751 A1 | 11/2003 | Kim et al. |
| 2004/0041723 A1 | 3/2004 | Shibamiya et al. |
| 2004/0070593 A1 | 4/2004 | Neely et al. |
| 2004/0111744 A1 | 6/2004 | Bae et al. |
| 2004/0168191 A1 | 8/2004 | Jerding et al. |
| 2004/0172651 A1 | 9/2004 | Wasilewski et al. |
| 2004/0201780 A1 | 10/2004 | Kim |
| 2004/0218905 A1 | 11/2004 | Green et al. |
| 2004/0230843 A1 | 11/2004 | Jansen |
| 2004/0255336 A1 | 12/2004 | Logan et al. |
| 2005/0002649 A1* | 1/2005 | Boyle et al. .................... 386/83 |
| 2005/0010949 A1 | 1/2005 | Ward et al. |
| 2005/0084233 A1 | 4/2005 | Fujii et al. |
| 2005/0128366 A1 | 6/2005 | Cha |
| 2005/0188402 A1* | 8/2005 | de Andrade et al. ............ 725/46 |
| 2005/0190280 A1 | 9/2005 | Haas et al. |
| 2005/0251826 A1 | 11/2005 | Orr |
| 2005/0268100 A1 | 12/2005 | Gasparini et al. |
| 2006/0037047 A1 | 2/2006 | DeYonker et al. |
| 2006/0051058 A1 | 3/2006 | Rudolph et al. |
| 2006/0061688 A1 | 3/2006 | Choi |
| 2006/0084409 A1 | 4/2006 | Ghadiali |
| 2006/0095907 A1* | 5/2006 | Krikorian et al. ................. 707/1 |
| 2006/0236342 A1* | 10/2006 | Kunkel et al. .................... 725/52 |
| 2007/0019111 A1 | 1/2007 | Won |
| 2007/0039019 A1 | 2/2007 | Collier |
| 2007/0039020 A1 | 2/2007 | Cansler, Jr. et al. |
| 2007/0061724 A1 | 3/2007 | Slothouber et al. |
| 2007/0074254 A1 | 3/2007 | Sloo |
| 2007/0079334 A1 | 4/2007 | Silver |

| | | | |
|---|---|---|---|
| 2007/0115391 | A1 | 5/2007 | Anderson |
| 2007/0130607 | A1 | 6/2007 | Thissen et al. |
| 2007/0192791 | A1 | 8/2007 | Sullivan et al. |
| 2007/0195197 | A1 | 8/2007 | Seong et al. |
| 2007/0199022 | A1 | 8/2007 | Moshiri et al. |
| 2007/0266397 | A1 | 11/2007 | Lin |
| 2007/0277224 | A1 | 11/2007 | Osborn et al. |
| 2008/0010518 | A1 | 1/2008 | Jiang et al. |
| 2008/0024682 | A1 | 1/2008 | Chen |
| 2008/0034314 | A1 | 2/2008 | Louch et al. |
| 2008/0052245 | A1 | 2/2008 | Love |
| 2008/0066102 | A1 | 3/2008 | Abraham et al. |
| 2008/0074550 | A1 | 3/2008 | Park |
| 2008/0088495 | A1 | 4/2008 | Kawakita |
| 2008/0129886 | A1 | 6/2008 | Ishihara |
| 2008/0147803 | A1 | 6/2008 | Krzyzanowski et al. |
| 2008/0184324 | A1 | 7/2008 | Yun et al. |
| 2008/0222523 | A1 | 9/2008 | Fox et al. |
| 2008/0229254 | A1 | 9/2008 | Warner |
| 2008/0231762 | A1 | 9/2008 | Hardacker et al. |
| 2008/0235735 | A1 | 9/2008 | Wroblewski |
| 2008/0263595 | A1 | 10/2008 | Sumiyoshi et al. |
| 2009/0007209 | A1 | 1/2009 | Kawai |
| 2009/0031335 | A1 | 1/2009 | Hendricks et al. |
| 2009/0031343 | A1 | 1/2009 | Sharkey |
| 2009/0141024 | A1 | 6/2009 | Lee et al. |
| 2009/0241145 | A1 | 9/2009 | Sharma |
| 2010/0050199 | A1 | 2/2010 | Kennedy |
| 2010/0071004 | A1 | 3/2010 | Wightman |
| 2010/0074592 | A1 | 3/2010 | Taxier et al. |
| 2010/0077432 | A1 | 3/2010 | VanDuyn et al. |
| 2010/0079671 | A1 | 4/2010 | VanDuyn et al. |
| 2010/0079681 | A1 | 4/2010 | Coburn et al. |
| 2010/0083309 | A1 | 4/2010 | White et al. |
| 2010/0083310 | A1 | 4/2010 | VanDuyn et al. |
| 2010/0083313 | A1 | 4/2010 | White et al. |
| 2010/0083315 | A1 | 4/2010 | White et al. |
| 2010/0083319 | A1 | 4/2010 | Martch et al. |
| 2010/0100909 | A1 | 4/2010 | Arsenault et al. |
| 2010/0115550 | A1 | 5/2010 | Minnick et al. |
| 2010/0169958 | A1 | 7/2010 | Werner et al. |

FOREIGN PATENT DOCUMENTS

| | | | |
|---|---|---|---|
| TW | 200729167 | | 1/2007 |
| WO | 0001142 | A1 | 1/2000 |
| WO | 0145395 | A | 6/2001 |
| WO | 0178054 | A1 | 10/2001 |
| WO | 0178383 | A2 | 10/2001 |
| WO | 02087243 | A | 10/2002 |
| WO | 03043320 | A2 | 5/2003 |
| WO | 2006119269 | A2 | 11/2006 |
| WO | 2006127211 | A2 | 11/2006 |
| WO | 2007015047 | A2 | 2/2007 |
| WO | 2008013350 | A2 | 1/2008 |

OTHER PUBLICATIONS

Nintendo, "Wii Operations Manual System Setup," 2007.
International Searching Authority, European Patent Office, International Search Report and Written Opinion, mailed Dec. 18, 2009; International Application No. PCT/US2009/058456, filed Sep. 25, 2009.
International Searching Authority, European Patent Office, International Search Report and Written Opinion, mailed Dec. 21, 2009; International Application No. PCT/US2009/058454 filed Sep. 25, 2009.
International Searching Authority, European Patent Office, International Search Report, mailed Jan. 20, 2010; International Application No. PCT/US2009/057825, filed Sep. 22, 2009.
Anonymous "ZigBee," Wikipedia, the Free Encyclopedia [online], Sep. 26, 2008, XP002558439; retrieved from the Internet: <URL:http://en.wikipedia.org/w/index.php?title=ZigBee&oldid=241085798> [retrieved on Dec. 2, 2009].
International Searching Authority, European Patent Office, International Search Report, mailed Dec. 7, 2009; International Application No. PCT/US2009/058457, filed Sep. 25, 2009.
International Searching Authority, European Patent Office, International Search Report, mailed Feb. 4, 2010; International Application No. PCT/US2009/058937, filed Sep. 30, 2009.
International Searching Authority, European Patent Office, International Search Report, mailed Feb. 16, 2010; International Application No. PCT/US2009/057582, filed Sep. 18, 2009.
Wightman, Robert Edward "Methods and Apparatus for Providing Multiple Channel Recall on a Television Receiver," U.S. Appl. No. 12/233,274, filed Sep. 18, 2008.
White, James Matthew et al. "Systems and Methods for Configuration of a Remote Control Device," U.S. Appl. No. 12/241,550, filed Sep. 30, 2008.
White, James Matthew et al. "Systems and Methods for Graphical control of User Interface Features Provided by a Television Receiver," U.S. Appl. No. 12/241,556, filed Sep. 30, 2008.
Vanduyn, Luke et al. "Systems and Methods for Graphical Control of Picture-In-Picture Windows," U.S. Appl. No. 12/241,571, filed Sep. 30, 2008.
White, James Matthew et al. "Systems and Methods for Providing Customer Service Features Via a Graphical User Interface in a Television Receiver," U.S. Appl. No. 12/241,580, filed Sep. 30, 2008.
Martch, Henry Gregg "Systems and Methods for Automatic Configuration of a Remote Control Device," U.S. Appl. No. 12/242,089, filed Sep. 30, 2008.
Minnick, Danny Jean et al., "Graphical Interface Navigation Based on Image Element Proximity," U.S. Appl. No. 12/609,860, filed Oct. 30, 2009.
Coburn, Matthew et al. "Systems and Methods for Graphical Control of Symbol-Based Features in a Television Receiver," U.S. Appl. No. 12/241,604, filed Sep. 30, 2008.
White, James Matthew et al. "Systems and Methods for Graphical Adjustment of an Electronic Program Guide," U.S. Appl. No. 12/241,608, filed Sep. 30, 2008.
Vanduyn, Luke et al. "Methods and Apparatus for Presenting Supplemental Information in an Electronic Programming Guide," U.S. Appl. No. 12/235,476, filed Sep. 22, 2008.
Vanduyn, Luke et al. "Methods and Apparatus for Providing Multiple Channel Recall on a Television Receiver," U.S. Appl. No. 12/242,587, filed Sep. 30, 2008.
Taxier, Karen Michelle et al. "Methods and Apparatus for Visually Displaying Recording Timer Information," U.S. Appl. No. 12/235,464, filed Sep. 22, 2008.
Martch, Henry Gregg et al. "Methods and Apparatus for Locating Content in an Electronic Programming Guide," U.S. Appl. No. 12/242,614, filed Oct. 17, 2008.
Taxier, Karen Michelle et al. "Apparatus and Methods for Dynamic Pictorial Image Authentication," U.S. Appl. No. 12/236,430, filed Sep. 23, 2008.
USPTO Non-Final Office Action mailed Jul. 6, 2011; U.S. Appl. No. 12/241,571, filed Sep. 30, 2008.
USPTO Non-Final Office Action mailed Jul. 12, 2011; U.S. Appl. No. 12/241,604, filed Sep. 30, 2008.
USPTO Final Office Action mailed Jun. 23, 2011; U.S. Appl. No. 12/241,580, filed Sep. 30, 2008.
USPTO Non-Final Office Action mailed Nov. 24, 2010; U.S. Appl. No. 12/242,587, filed Sep. 30, 2008.
USPTO Non-Final Office Action mailed Jan. 12, 2011; U.S. Appl. No. 12/241,580, filed Sep. 30, 2008.
USPTO Non-Final Office Action mailed Jan. 28, 2011; U.S. Appl. No. 12/236,430, filed Sep. 23, 2008.
USPTO Non-Final Office Action mailed Feb. 9, 2011; U.S. Appl. No. 12/241,608, filed Sep. 30, 2008.
USPTO Non-Final Office Action mailed Dec. 21, 2010; U.S. Appl. No. 12/235,476, filed Sep. 22, 2008.
USPTO Non-Final Office Action mailed Mar. 31, 2011; U.S. Appl. No. 12/241,556, filed Sep. 30, 2008.
The International Bureau of WIPO International Preliminary Report on Patentability mailed Apr. 14, 2011; International Appln. No. PCT/US2009/058236, filed Sep. 24, 2009.
USPTO Final Office Action mailed May 13, 2011; U.S. Appl. No. 12/242,587, filed Sep. 30, 2008.
European Patent Office, International Searching Authority, International Search Report mailed Nov. 10, 2009; International Appln. No. PCT/EP2009/061499.
USPTO Non-Final Office Action mailed Jan. 31, 2011; U.S. Appl. No. 12/233,274, filed Sep. 18, 2008.

USPTO Final Office Action mailed May 13, 2011; U.S. Appl. No. 12/235,476, filed Sep. 22, 2008.

USPTO Final Office Action mailed Oct. 21, 2011; U.S. Appl. No. 12/241,571, filed Sep. 30, 2008.

USPTO Final Office Action mailed Oct. 5, 2011; U.S. Appl. No. 12/241,556, filed Sep. 30, 2008.

USPTO Final Office Action mailed Jul. 28, 2011; U.S. Appl. No. 12/241,608, filed Sep. 30, 2008.

USPTO Final Office Action mailed Aug. 18, 2011; U.S. Appl. No. 12/233,274, filed Sep. 18, 2008.

USPTO Final Office Action mailed Jan. 20, 2012; U.S. Appl. No. 12/241,604, filed Sep. 30, 2008.

USPTO Non-Final Office Action mailed Mar. 7, 2012; U.S. Appl. No. 12/235,464, filed Sep. 22, 2008.

USPTO Non-Final Office Action mailed Mar. 22, 2012; U.S. Appl. No. 12/241,556, filed Sep. 30, 2008.

USPTO Non-Final Office Action mailed Apr. 17, 2012; U.S. Appl. No. 12/241,608, filed Sep. 30, 2008.

USPTO Non-Final Office Action mailed Nov. 23, 2011; U.S. Appl. No. 12/242,614, filed Sep. 30, 2008.

USPTO Non-Final Office Action mailed Dec. 6, 2011; U.S. Appl. No. 12/241,580, filed Sep. 30, 2008.

USPTO Final Office Action mailed Apr. 25, 2012; U.S. Appl. No. 12/242,614, filed Sep. 30, 2008.

USPTO Non-Final Office Action mailed Apr. 24, 2012; U.S. Appl. No. 12/235,476, filed Sep. 22, 2008.

United States Patent and Trademark Office, Office Action for U.S. Appl. No. 12/242,587, dated Jun. 5, 2012.

USPTO Final Office Action mailed Aug. 8, 2012 for U.S. Appl. No. 12/241,556, filed Sep. 30, 2008.

USPTO Non-Final Office Action mailed Jun. 28, 2012 for U.S. Appl. No. 12/241,571, filed Sep. 30, 2008.

USPTO Non-Final Office Action mailed Jul. 26, 2012 for U.S. Appl. No. 12/609,860, filed Oct. 30, 2009.

USPTO Final Office Action mailed Aug. 1, 2012 for U.S. Appl. No. 12/241,608, filed Sep. 30, 2008.

USPTO Final Office Action mailed Jul. 17, 2012 for U.S. Appl. No. 12/241,580, filed Sep. 30, 2008.

USPTO Final Office Action mailed Aug. 9, 2012 for U.S. Appl. No. 12/235,476, filed Sep. 22, 2008.

USPTO Final Office Action mailed Sep. 14, 2012 for U.S. Appl. No. 12/242,587, filed Sep. 30, 2008.

USPTO Final Office Action mailed Oct. 9, 2012 for U.S. Appl. No. 12/235,464, filed Sep. 22, 2008.

Intellectual Property Office "Office Action" issued Oct. 30 2012 for Taiwan Patent Appln. No. 098127902.

Intellectual Property Office "Office Action" issued Oct. 25, 2012 for Taiwan Patent Appln. No. 098127906.

USPTO "Final Office Action" mailed Jan. 23, 2013 for U.S. Appl. No. 12/241,604, filed Sep. 30, 2008.

USPTO "Final Office Action" mailed Nov. 13, 2012 for U.S. Appl. No. 12/609,860, filed Oct. 30, 2009.

USPTO "Final Office Action" mailed Nov. 13, 2012 for U.S. Appl. No. 12/24,571, filed Sep. 30, 2008.

USPTO "Non'Final Office Action" mailed Nov. 15, 2012 for U.S. Appl. No. 12/241,608, filed Sep. 30, 2008.

USPTO "Non-Final Office Action" mailed Dec. 5, 2012 for U.S. Appl. No. 12/24,556, filed Sep. 30, 2008.

* cited by examiner

SYSTEMS AND METHODS FOR GRAPHICAL CONTROL OF USER INTERFACE FEATURES IN A TELEVISION RECEIVER

TECHNICAL FIELD

The present invention generally relates to user interfaces in television receiver devices, and more particularly relates to systems and methods for providing graphical adjustment and control of user interface features provided by a television receiver device.

BACKGROUND

Most television viewers now receive their television signals through a content aggregator such as a cable or satellite television provider. For subscribers to a direct broadcast satellite (DBS) service, for example, television programming is received via a broadcast that is sent via a satellite to an antenna that is generally located on the exterior of a home or other structure. Other customers receive television programming through conventional television broadcasts, or through cable, wireless or other media. Programming is typically received at a receiver such as a "set top box" (STB) or other receiver that demodulates the received signals and converts the demodulated content into a format that can be presented to the viewer on a television or other display. In addition to receiving and demodulating television programming, many television receivers are able to provide additional features. Examples of features available in many modern television receivers include electronic program guides (EPGs), digital or other personal video recorders, "place-shifting" features for streaming received content over a network or other medium, providing customer service information and/or the like.

Generally speaking, viewers interact with the STB or other receiver using some sort of user interface that receives inputs from a remote control or other input device. To change a channel, for example, the viewer typically depresses a "channel up/down" button, manually enters a number of a desired channel on a numeric keypad, and/or selects the new channel using a program guide feature of the receiver. Alternatively, viewers can often seek out programs using an EPG feature provided by the receiver. In general, the viewer tunes programs, selects features and otherwise interacts with the television receiver using conventional buttons on a remote control.

While conventional interfaces are useful for many purposes, there remains a continual desire for more efficient and intuitive user interfaces to the various features provided by the receiver. In particular, there is a desire to provide convenient access to user interface features using more advanced input techniques. It is therefore desirable to create systems and methods for improving the viewer interface to the television receiver. These and other desirable features and characteristics will become apparent from the subsequent detailed description and the appended claims, taken in conjunction with the accompanying drawings and this background section.

BRIEF SUMMARY

According to various exemplary embodiments, systems and methods are provided for graphically providing numeric inputs or other controls a set-top box (STB) or other video receiver.

In various embodiments, a method is provided for graphically features on a set top box (STB) or other television receiver in response to viewer instructions received from a remote control. Imagery including various tiles each corresponding to one of the provided features is presented on the display. A two-dimensional input is received from the remote control that indicates a selected one of the plurality of tiles, and, in response to the received two-dimensional input, the feature associated with the selected tile is provided.

In further embodiments, a method is provided for selecting a desired channel in a television receiver configured to present imagery on a display in response to viewer instructions transmitted from a remote control. The method comprises presenting the imagery on the display, wherein the imagery comprises a plurality of tiles each corresponding to one of the plurality of features, receiving a two-dimensional input from the remote control that indicates a selected one of the plurality of tiles, wherein the selected one of the plurality of tiles has an associated channel number, and, in response to the received two-dimensional input, tuning the television receiver to the associated channel number to thereby present programming from the desired channel on the display.

Still other embodiments provide a video receiver for presenting imagery on a display in response to viewer input signals provided from a remote control. The receiver comprises a receiver interface configured to receive an incoming modulated signal, a decoder configured to decode the incoming modulated signal to extract a video signal, a wireless receiver configured to receive the viewer input signals from the remote control, wherein the viewer input is a two-dimensional input, and a processor. The processor is configured generate the imagery presented on the display, wherein the imagery comprises a plurality of tiles each corresponding to one of the plurality of features. The processor is further configured to receive the viewer input signals from the remote control, and, in response to the received two-dimensional input indicating a selected one of the plurality of tiles, to provide the feature associated with the selected tile.

Various other embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements, and FIG. 1 is a block diagram of an exemplary television receiver system;

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

Generally speaking, the viewer is able to access channels, programs, program guide information, placeshifting features, customer service features and/or any other features through a graphical user interface that includes various tiles that can be selected using a two-dimensional input device. In various embodiments, the viewer manipulates a touchpad or other two-dimensional input feature incorporated within a remote control to direct a cursor toward one or more tiles. By selecting the tile, a feature associated with the tile can be accessed. Features that can be associated with tiles include tuning particular channels or programs, setting recordings or other features associated with a PVR or placeshifting feature, accessing further menuing features provided by the receiver, and/or the like. Further, in many embodiments, the features associated with one or more tiles may be individually configured by the viewer and/or a content provider to customize the interface provided to the viewer by the receiver.

Figure 1:
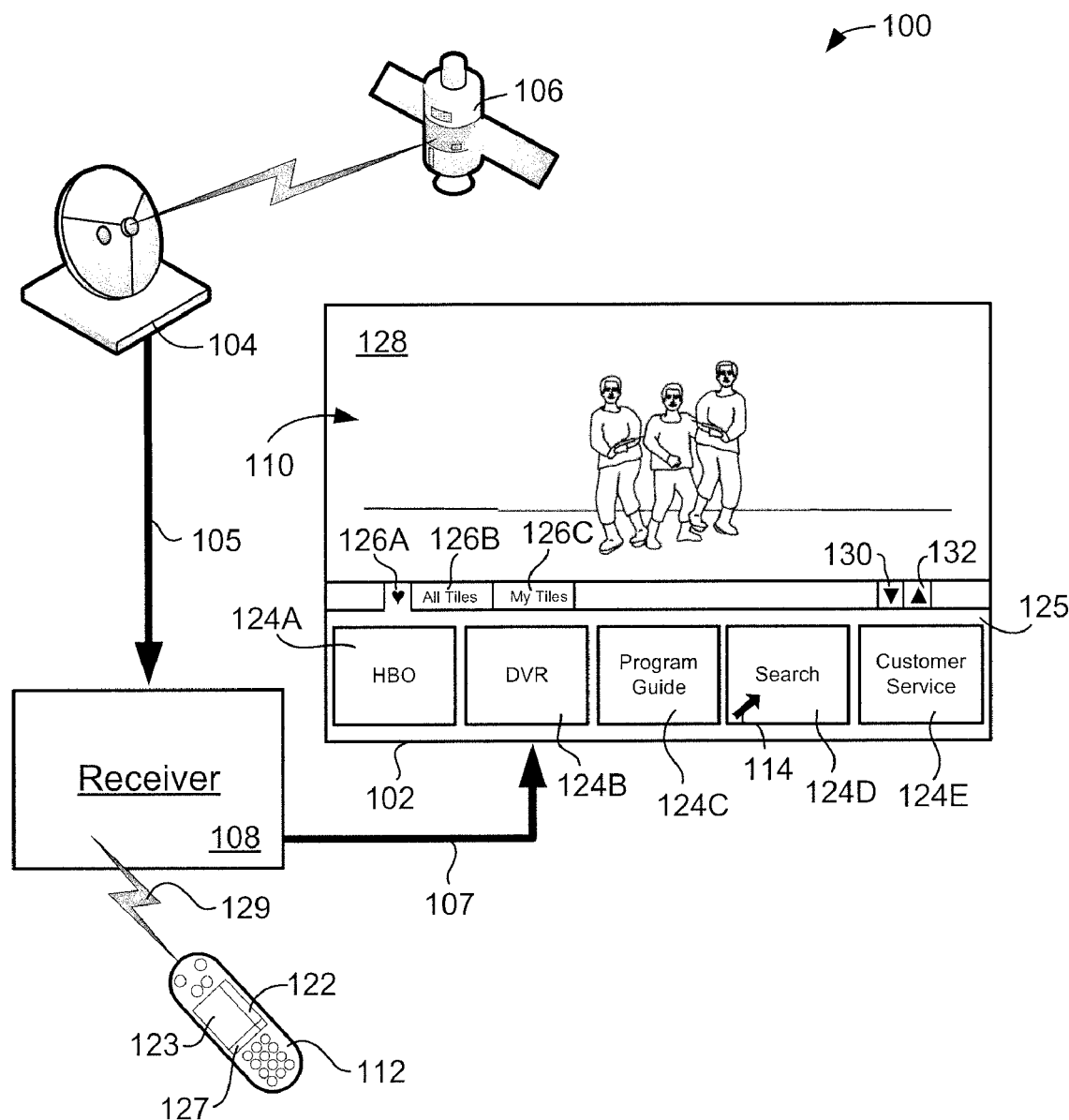

Turning now to the drawing figures and with initial reference to FIG. 1, an exemplary system 100 for presenting television signals to a viewer suitably includes a receiver 108 that receives signals 105 in any format and generates appropriate outputs 107 to generate imagery 110 on display 102. Typically, receiver 108 interacts with signals 129 received from a wireless remote control 112 to present television imagery 110 on display 102 as desired by the viewer. The various features presented in imagery 110 may vary widely from embodiment to embodiment. The relative spacing, proportions and locations of the various windows and other features described herein, for example, are entirely exemplary, and may vary widely in other embodiments. Other embodiments may similarly add or omit certain features, or use the various features for purposes other than those described herein.

Television imagery is presented on display 102 in any manner. Further, two-dimensional navigation features may be presented to allow the viewer to access various features of receiver 108 through control of a cursor 114 or other interface feature via remote control 112. In various embodiments, cursor 114 is able to move in response to two-dimensional input signals 129, which are, in turn, generated in response to inputs applied to two-dimensional input device 123. By moving cursor 114 to interact with the two-dimensional navigation features presented on display 102, various channels, programs, and/or other features may be tuned, activated or otherwise manipulated as desired.

Receiver 108 is any component, device or logic capable of receiving and decoding video signals 105. In various embodiments, receiver 108 is a set-top box (STB) or the like capable of receiving satellite, cable, broadcast and/or other signals encoding audio/visual content. Receiver 108 may further demodulate or otherwise decode the received signals 105 to extract programming that can be locally viewed on display 102 as desired. Receiver 108 may also include a content database stored on a hard disk drive, memory, or other storage medium to support a digital or other personal video recorder (DVR/PVR) feature in some embodiments. Receiver 108 may also provide place shifting, electronic program guide, multi-stream viewing and/or other features as appropriate.

In the exemplary embodiment illustrated in FIG. 1, receiver 108 is shown receiving digital broadcast satellite (DBS) signals 105 from a satellite 106 at an antenna 104. Equivalent embodiments, however, could receive programming 105 from one or more programming sources, including any sort of satellite, cable or broadcast source, as well as any Internet or other network source or the like. In embodiments that include DVR functionality, programming may be stored in any sort of database as desired (e.g., in response to user/viewer programming instructions) for subsequent viewing. Content may also be received from digital versatile disks (DVDs) or other removable media in some embodiments.

Display 102 is any device capable of presenting imagery 110 to a viewer. In various embodiments, display 102 is a conventional television set, such as any sort of television operating in accordance with any digital or analog protocols, standards or other formats. Display 102 may be a conventional NTSC or PAL television receiver, for example. In other embodiments, display 102 is a monitor or other device that may not include built-in receiver functionality, but that is nevertheless capable of presenting imagery in response to signal 107 received from receiver 108. In various embodiments, receiver 108 and display 102 may be physically combined or interconnected in any manner. A receiver card, for example, could be inserted into a slot or other interface in a conventional television, or the functionality of receiver 108 may be provided within a conventional television display 102. In other embodiments, signals 107 are transferred between receiver 108 and display 102 using any sort of cable or other interface (including a wireless interface). Examples of common interfaces include, without limitation, component video, S-video, High-Definition Multimedia Interface (HDMI), Digital Visual Interface (DVI), IEEE 1394, and/or any other formats as desired.

Remote control 112 is any sort of control device capable providing signals 129 to receiver 108 that represent inputs received from one or more viewers. Typically, remote control 112 is an infrared, radio frequency (RF) or other wireless remote that includes any number of buttons or other features for receiving viewer inputs. In an exemplary embodiment, remote control 112 communicates with receiver 108 using the IEEE 802.15.4 ("ZIGBEE") protocol for wireless personal area networks (WPANs), although other embodiments may instead communicate using IEEE 802.15.1 ("BLUETOOTH"), IEEE 802.11 ("WI-FI"), conventional infrared, and/or any other wireless techniques. In some embodiments, remote control 112 may be able to support multiple types of wireless communication, such as ZIGBEE communications and also infrared communications. This feature may be useful when remote control 112 is a so-called universal remote that is able to provide input signals 129 to multiple devices.

Remote control 112 generally includes any sort of buttons, sliders, rocker switches and/or other features for receiving physical inputs from the viewer. As the user depresses or otherwise interacts with the features, remote control 112 suitably produces wireless signals 129 in response. In further embodiments, remote control 112 includes a two-dimensional input device 123 that is able to receive inputs from the user in any multi-dimensional format (e.g., "X,Y", "r,Θ", and/or the like). Examples of two-dimensional input devices 123 that could be used in various embodiments include, without limitation, touchpads, directional pads, joysticks, trackballs, sets of arrows or other buttons, and/or the like. In a typical implementation, two-dimensional input device 123 provides coordinates or other signals 129 that indicate absolute (e.g., "X,Y") and/or relative (e.g., "ΔX,ΔY") movement in two or more dimensions. Such signals 129 may be decoded at controller 108 or elsewhere to coordinate the viewer's actions with respect to input device 123 to movement of cursor 114 or other features presented on display 102.

In the exemplary embodiment shown in FIG. 1, remote control 112 is illustrated with a touchpad-type device 123 that accepts viewer inputs applied with a finger, stylus or other object. FIG. 1 also shows touchpad device 123 as having dedicated scroll regions 122 and 127 for vertical and horizontal scrolling, respectively. Viewer movements within region 122 that are more-or-less parallel to the right edge of device 123, for example, could result in vertical scrolling, whereas movements within region 127 that are more-or-less parallel to the bottom edge of device 123 could result in horizontal scrolling. Dedicated scrolling regions 122, 127 are optional features, however, that may not be present in all embodiments. Further, scrolling could be implemented in any other manner.

In operation, then, receiver 108 suitably receives television signals 105 from a satellite, cable, broadcast or other source. In a satellite based embodiment, for example, one or more channels can be extracted from a conventional satellite feed; the video content on the selected channel can be demodulated, extracted and otherwise processed as appropriate to display the desired content to the viewer. One or more cable or broadcast channels may be similarly obtained in any manner. In some embodiments, receiver 108 may obtain multiple channel signals from different sources (e.g., one channel from a cable or satellite source and another channel from a terrestrial broadcast, DVD or other source).

Receiver 108 suitably obtains the desired content from the channel(s) indicated by the viewer, and presents the content on display 102. In various embodiments, viewers are able to further view imagery (e.g., the imagery 110 shown in FIG. 1) that is responsive to two-dimensional inputs generated using remote control 112. By moving cursor 114 with respect to imagery 110, for example, tiles or other features can be pointed and selected to activate various features of receiver 108. A viewer may tune receiver 108 to a particular channel or program, for example, by directing cursor 114 toward a tile that is associated with the desired feature, and then depressing a select or enter key on the remote 112 to select the indicated feature. Selected features may be displayed or otherwise activated as desired.

Imagery 110 may be organized and presented in any manner. In the exemplary embodiment shown in FIG. 1, imagery 110 includes any number of tiles 124A-E that are organized into one or more windows 125. Imagery 110 also includes icons or other features 130, 132 for decreasing or increasing (respectively) the size of window 125. Selecting feature 130 with cursor 114, for example, could result in window 125 being removed from imagery 110, whereas selecting feature 132 could increase the size of window 125 so that more tiles 124 are viewable. In some embodiments, selecting feature 132 creates a full-screen view of tile window 125, although in other embodiments this may not be the case. Exemplary imagery 110 in FIG. 1 also shows decoded television imagery presented in window 128. Other embodiments may show generated imagery (e.g., program guide information or the like) when tile window 125 is visible. FIG. 1 also shows several tabs 126A-C that allow for different tile windows 125 to be presented. In the embodiment shown in FIG. 1, tab 126A corresponds to an initial or default view, tab 126A corresponds to a view of all available tiles, and tab 126C corresponds to a window that presents a sub-set of tiles selected by the viewer. Additional tabs 126 could also be provided to allow for multiple custom tile sets, or other features as desired. The particular content presented as part of imagery 110, as well as the layout, spacing, dimensions and particular presentation style of such content, may vary significantly from embodiment to embodiment.

In the exemplary embodiment shown in FIG. 1, various interface tiles 124A-E are each associated with a program, network, or other feature of receiver 108. Tile 124A, for example, is associated with a television network (e.g., Home Box Office). Tile 124B is shown associated with a digital video recorder. Tile 124C is shown associated with an electronic program guide, and tiles 124D and 124E are shown associated with a search feature and a customer service feature, respectively. Selecting tiles 124B or 124C in this example could open up interface windows related to the DVR or EPG features, respectively, whereas selecting tile 124D could lead to an interface feature that would allow the viewer to search for programs or other content available via a DVR, the EPG, a placeshifting device, or any other source as desired. Customer service tile 124E could allow the viewer to access customer service information such as instructions on using receiver 108, billing information, information that allows for purchase or expansion of services, or any other features as desired.

The particular tiles 124A-E shown in FIG. 1 are purely exemplary, and alternate embodiments may provide additional tiles, alternate tiles or fewer tiles as appropriate. Moreover, the various tiles may have any shape, appearance or the like. Although tiles 124A-E in FIG. 1 are generally square or rectangular in shape, other embodiments could provide tiles that are round, or that have any regular or irregular shape whatsoever. Further, the information identifying each tile 124A-E need not be purely textual as shown in FIG. 1; alternate embodiments may provide tiles 124A-E with any sort of graphic, logo, text, numerical information and/or the like.

In various embodiments, the particular tiles displayed on any window 126 are configurable so that the viewer and/or a service provider are able to choose particular tiles for presentation on display 102. Tab 126C, for example, may allow a customized set of tiles to be provided for a particular viewer or receiver 104. Tabs 126 may be selected in any manner. Viewers may be able to drag tiles, for example, from the default view (tab 126A) or another view (e.g., the "all tiles" tab 126B) to the custom tile view (e.g., tab 126C). Other embodiments may select tabs for custom lists in any other manner. Further, the features performed by certain tiles may be configurable. A "favorite channel" tile, for example, could be configured to tune to a channel that is configurable by the viewer, since this feature would vary from viewer to viewer. Other parameters may be adjusted based on temporal factors, viewer preferences, and/or other factors as appropriate.

Figure 2:
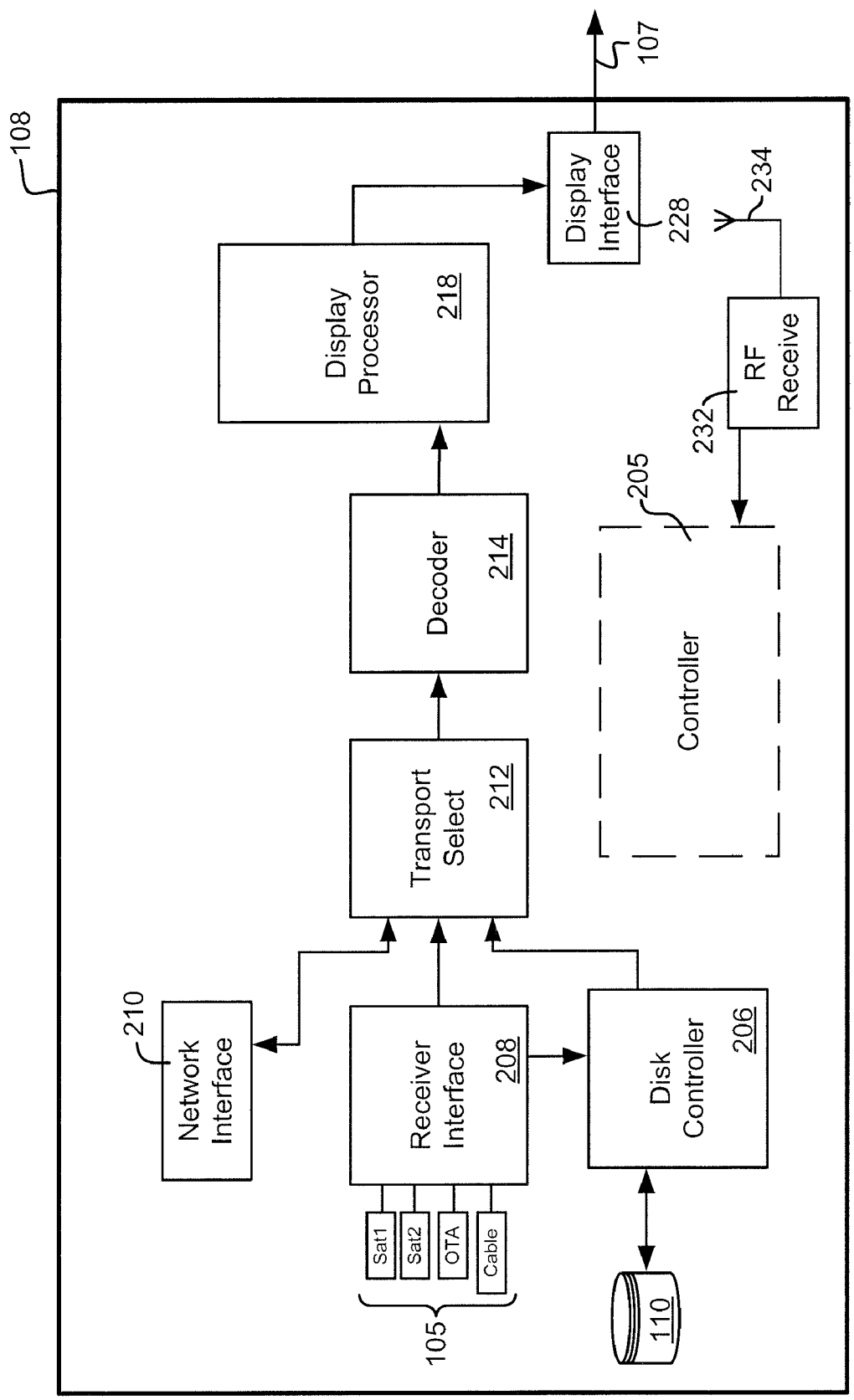
FIG. 2 is a block diagram of an exemplary television receiver device.

FIG. 2 provides additional detail about an exemplary receiver 108 that includes a receiver interface 208, a decoder 214 and a display processor 218, as appropriate. FIG. 2 also shows a disk controller interface 206 to a disk or other storage device 110, an interface 210 to a local or wide area network, a transport select module 212, a display interface 228, an RF receiver module and control logic 205. Other embodiments may incorporate additional or alternate processing modules from those shown in FIG. 2, may omit one or more modules shown in FIG. 2, and/or may differently organize the various modules in any other manner different from the exemplary arrangement shown in FIG. 2.

Receiver 108 may be physically and logically implemented in any manner. FIG. 2 shows various logical and functional features that may be present in an exemplary device; each module shown in the figure may be implemented with any sort of hardware, software, firmware and/or the like. Any of the various modules may be implemented with any sort of general or special purpose integrated circuitry, for example, such as any sort of microprocessor, microcontroller, digital signal processor, programmed array and/or the like. Any number of the modules shown in FIG. 2, for example, may be implemented as a "system on a chip" (SoC) using any suitable processing circuitry under control of any appropriate control logic 205. In various embodiments, control logic 205 executes within an integrated SoC or other processor that implements receiver interface 208, transport selector 212, decoder 214, display processor 218, disk controller 206 and/or other features, as appropriate. The Broadcom Corporation of Irvine, Calif., for example, produces several models of processors (e.g., the model BCM 7400 family of processors) that are capable of supporting SoC implementations of satellite and/or cable receiver systems, although products from any number of other suppliers could be equivalently used. In still other embodiments, various distinct chips, circuits or components may be inter-connected and inter-relate with each other to implement the receiving and decoding functions represented in FIG. 2.

Various embodiments of receiver 108 therefore include any number of appropriate modules for obtaining and processing media content as desired for the particular embodiment. Each of these modules may be implemented in any combination of hardware and/or software using logic executed within any number of semiconductor chips or other processing logic.

Various embodiments of control logic 205 can include any circuitry, components, hardware, software and/or firmware logic capable of controlling the various components of receiver 108. Various routines, methods and processes executed within receiver 108 are typically carried out under control of control logic 205, as described more fully below. Generally speaking, control logic 205 receives user input signals 129 (FIG. 1) via an RF receiver interface 232 that is able to communicate with the remote control 112 using a suitable antenna 234. Control logic receives user inputs from remote control 112 and/or any other source, and directs the other components of receiver 108 in response to the received inputs to present the desired imagery on display 102.

As noted above, receiver 108 suitably includes a receiver interface 208, which is any hardware, software, firmware and/or other logic capable of receiving media content via one or more content sources 105. In various embodiments, content sources 105 may include cable television, direct broadcast satellite (DBS), broadcast and/or other programming sources as appropriate. Receiver interface 208 appropriately selects a desired input source and provides the received content to an appropriate destination for further processing. In various embodiments, received programming may be provided in real-time (or near real-time) to a transport stream select module 212 or other component for immediate decoding and presentation to the user. Alternatively, receiver interface 208 may provide content received from any source to a disk or other storage medium in embodiments that provide DVR functionality. In such embodiments, receiver 108 may also include a disk controller module 206 that interacts with an internal or external hard disk, memory and/or other device that stores content in a database 110, as described above.

In the embodiment shown in FIG. 2, receiver 108 also includes an appropriate network interface 210, which operates using any implementation of protocols or other features to support communication by receiver 108 on any sort of local area, wide area, telephone and/or other network. In various embodiments, network interface 210 supports conventional LAN, WAN or other protocols (e.g., the TCP/IP or UDP/IP suite of protocols widely used on the Internet) to allow receiver 108 to communicate on the Internet or any other network as desired. Network interface 210 typically interfaces with the network using any sort of LAN adapter hardware, such as a conventional network interface card (NIC) or the like provided within receiver 108. Other embodiments may provide interfaces 210 to conventional telephone lines or other communications channels, or may omit network connectivity altogether.

Transport stream select module 212 is any hardware and/or software logic capable of selecting a desired media stream from the available sources. In the embodiment shown in FIG. 2, stream select module 212 is able to generate video signals for presentation on one or more output interfaces 228. Typically, transport select module 212 responds to viewer inputs (e.g., via control logic 205) to simply switch encoded content received from a broadcast, satellite, cable or other source 105 or from storage 110 to one or more decoder modules 214.

Receiver 108 may include any number of decoder modules 214 for decoding, decompressing and/or otherwise processing received/stored content as desired. Generally speaking, decoder module 214 decompresses, decodes and/or otherwise processes received content from stream select module 212 to extract an MPEG or other media stream encoded within the stream. The decoded content can then be processed by one or more display processor modules 218 to create a presentation on display 102 (FIG. 1) for the viewer in any appropriate format. FIG. 2 shows a single decoder module 214 operating on one television signal received from transport select module 212. In practice, any number of decoder modules 214 may be used, particularly in "picture in picture" (PIP) situations when multiple signals are simultaneously decoded and displayed. The term "decoder", then, may collectively apply to one or more decoder modules that are able to decode one or more signals for presentation on display 104.

Display processor module 218 includes any appropriate hardware, software and/or other logic to create desired screen displays via display interface 228 as desired. Such displays may include combining signals received from one or more decoder modules 214 to facilitate viewing of one or more channels. In various embodiments, display processing module 218 is also able to produce on screen displays (OSDs) for electronic program guide, setup and control, input/output facilitation and/or other features that may vary from embodiment to embodiment. Such displays are not typically contained within the received or stored broadcast stream, but are nevertheless useful to users in interacting with receiver 108 or the like. The generated displays, including received/stored content and any other displays may then be presented to one or more output interfaces 228 in any desired format. The various interface features described herein, for example, may be generated by display processor module 218 operating alone or in conjunction with control logic 205.

Display processor 218 may also generate imagery 110 in response to viewer inputs received (and/or in response to instructions from command logic 205) to thereby make up a user interface that allows the viewer select channels or programs, or to perform other tasks as desired. When the viewer provides inputs at tiles 124 or any other user interface features, for example, display processor 218 may be operable to draw (or redraw) imagery 110 in response, and/or to present television content identified by the viewer, as appropriate. As receiver 108 receives user inputs 129 from remote control 112, control logic 205 may direct display processor 218 to adjust any feature(s) of imagery 110 as directed by the viewer. Display processor 218 therefore directs the presentation of imagery 110 in conjunction with one or more navigation features, and adjusts the imagery 110 in response to inputs received from the viewer.

Display processor 218 produces an output signal encoded in any standard format (e.g., ITU656 format for standard definition television signals or any format for high definition television signals) that can be readily converted to standard and/or high definition television signals at interface 228. In other embodiments, the functionality of display processor 218 and interface 228 may be combined in any manner.

Figure 3:
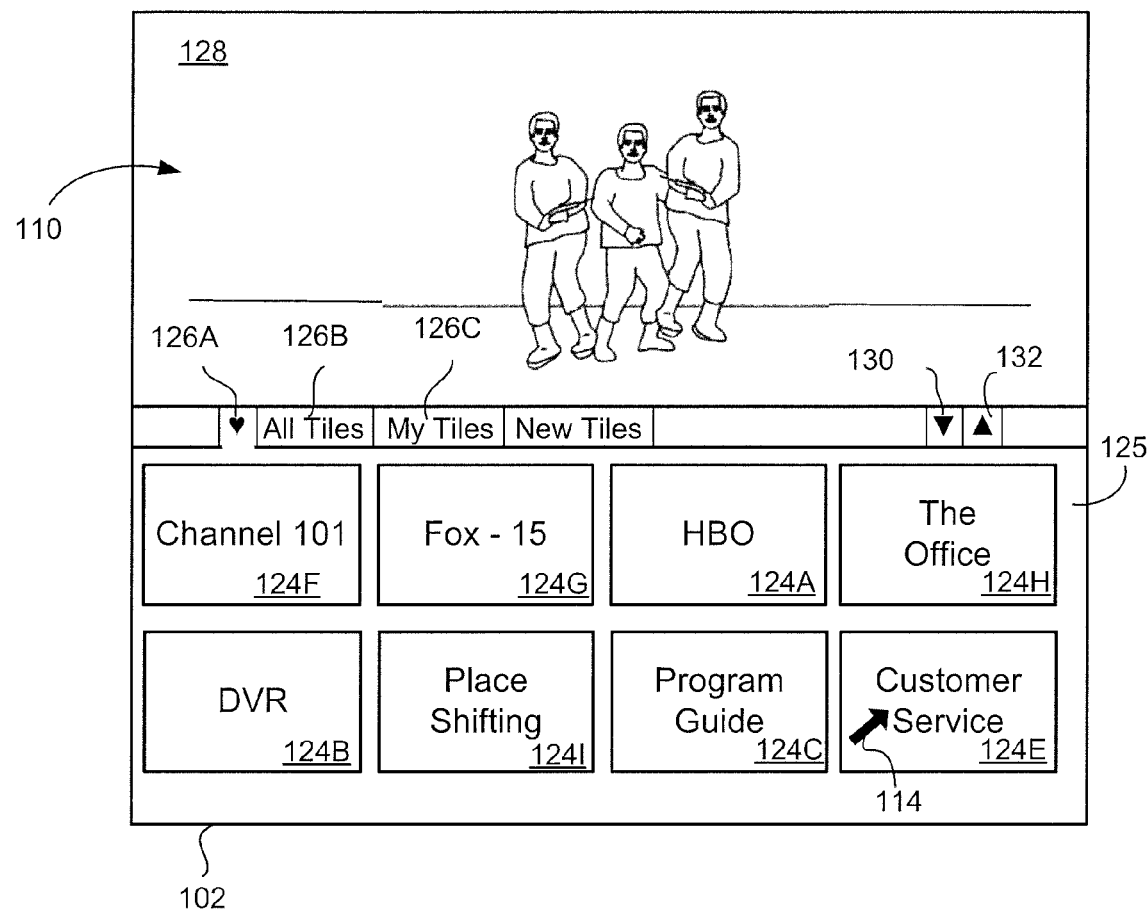
FIG. 3 is a diagram of an exemplary screen display for receiving and processing inputs from the viewer.

FIG. 3 shows an exemplary presentation of imagery 110 that includes any number of tiles 124A-I and that would allow a viewer to select features using a remote control 112 with two-dimensional input capability. Other embodiments may incorporate imagery 110 of different sizes and configurations, and/or may allow for additional or other features in any manner. Practical views of imagery 110 presented on display 102 may vary widely from that shown in FIG. 3 without departing from the concepts discussed herein.

In the embodiment shown in FIG. 3, the viewer guides cursor 114 over one or more tiles 124 or other images associated with imagery 110 using the touchpad, motion sensor or other two-dimensional feature 123 associated with remote control 112. When the cursor 114 is positioned as desired, the viewer may be able to select the tile 124 or other feature by depressing a "select" or "enter" key, as appropriate. The "select" key may be a button or trigger on remote 112, for example, or may be any other interface feature as desired.

As noted above, the particular features executed by any particular tile can vary widely from embodiment to embodiment, and even from tile to tile. Selecting a network tile (e.g., tile 124A), for example, may result in any actions associated with that network being executed. A particular channel could be tuned, for example, or other features could be provided as appropriate. Such features may include, for example, specific information about the network or programs produced by the network. Other features could include scheduling or program guide information that is specific to the network. In still other embodiments, the viewer may be able to select and view preview clips, informational clips, or other additional content about programs shown on the associated network. Such information may be downloaded, for example, via a digital network or via satellite, cable and/or other programming signals 105 delivered to receiver 108. In some embodiments, tiles (e.g., network tile 124A) could be sponsored tiles in which a DBS, cable or other television service provider send instructions to receiver 108 to display a sponsored tile 124A at appropriate times.

Similarly, tiles associated with particular programs (e.g, tile 124H in FIG. 3) could be associated with any features relating to that program. In some embodiments, program tile 124H may be visible only when the associated program is being broadcast, thereby allowing the program to be immediately tuned by receiver 108 upon selection of tile 124H. In other embodiments, selecting tile 124H could result in setting a DVR to record an upcoming showing of the program. In still other embodiments, selecting tile 124H may result in the viewer being presented with additional information about the associated program, such as "behind the scenes" informational clips, clips of interviews with people associated with the program, episode previews, or even entire episodes for download, "on demand" viewing, or other features as desired. In various embodiments, some or all of the content presented in response to selection of program tile 124H is downloaded from a program source (e.g., satellite 106, or any service provider resource associated with any sort of DBS, cable or broadcast service) beforehand. In still other embodiments, selecting a program tile 124H results in information about the associated program being downloaded from a remote source. Such download may take place immediately (e.g., over a digital network), or at a later time as appropriate.

Channel tiles (e.g., tiles 124F-G) may be associated with particular channels in any manner. Selection of these tiles may result in the particular channel being immediately tuned by receiver 108 so that programming on that channel can be presented. In other embodiments, program guide information for that channel can be displayed so the viewer can see upcoming programming on that channel. In still other embodiments, particular channels may provide other information (e.g., RSS feeds for weather, traffic, local news and/or other information) that can be displayed in response to selection of the tile. Other features may be alternately or additionally provided as desired.

As noted above, other tiles could be formulated for any purpose or feature. Other tiles may allow for viewer settings, for example, that would allow the viewer to configure receiver 108 in any manner. Tiles 124B, 124C, 124I shown in FIG. 3 provide for DVR, EGP, or placeshifting features, respectively; simply clicking on these tiles could bring up a window or other interface associated with the selected feature. Again, additional or alternate features may be provided as well.

Figure 4:
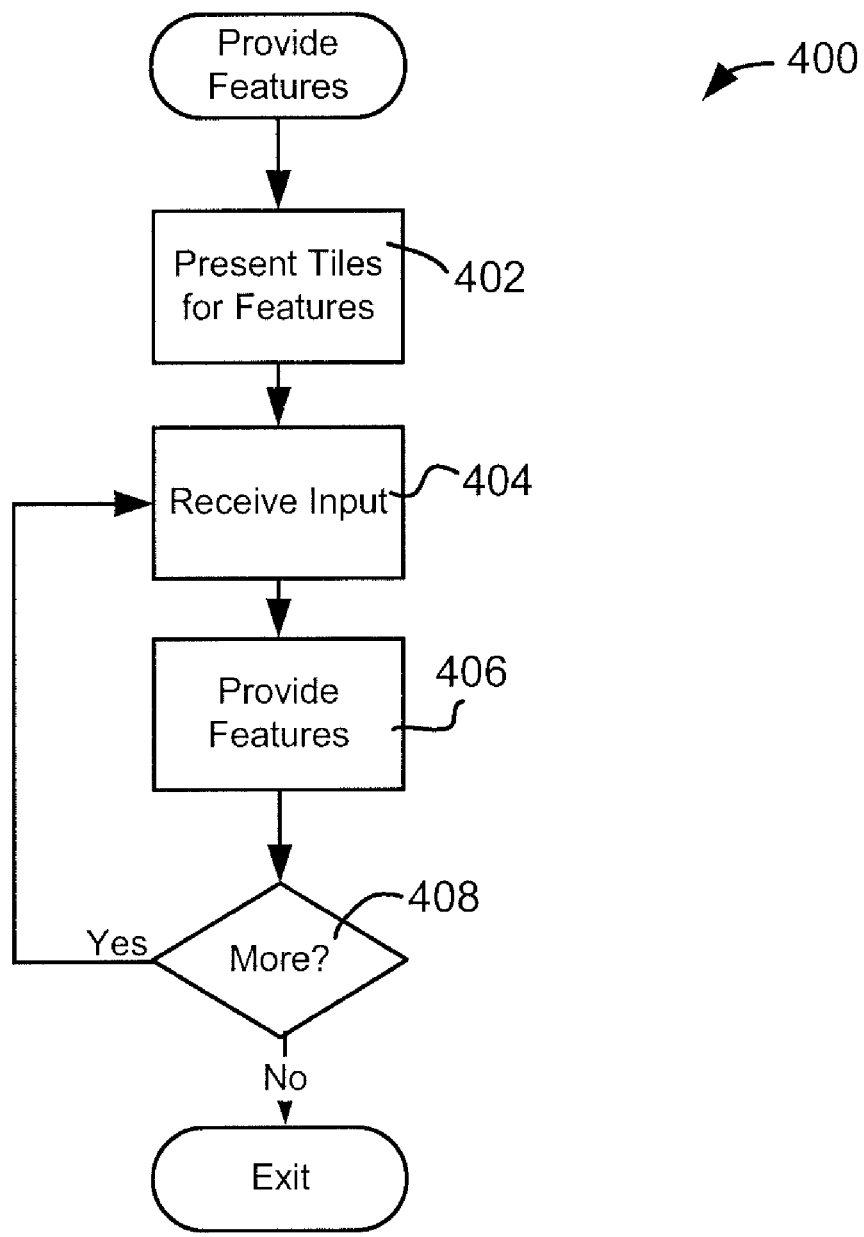
FIG. 4 is a flowchart showing an exemplary process for manipulating received viewer inputs in a television receiver or other device.

FIG. 4 shows an exemplary process 400 for graphically processing inputs in a television receiver or the like. In various embodiments, the steps shown in FIG. 4 may be executed using source or object code in any format that may be stored in mass storage, firmware, memory or any other digital storage medium within receiver 108. Such code may be executed by any module or combination of modules operating within receiver 108. In an exemplary embodiment, some or all of the steps shown in process 400 are executed by control logic 205 (FIG. 2) operating alone or in conjunction with a display processing module 218 and/or the various other features shown in FIG. 2 and described above. While FIG. 4 specifically shows a technique for tuning channels on a television receiver, the concepts set forth in the figure and accompanying text could be used to perform other tasks, such as recording programs, selecting programs, searching and/or taking other actions as appropriate. The various steps and actions set forth in FIG. 4 may therefore be supplemented or otherwise modified in any manner.

With reference now to FIG. 4, an exemplary method 400 for graphically providing various features in a television receiver 108 suitably includes the broad steps of displaying imagery 110 that includes one or more tiles 124 (step 402), receiving inputs from a two-dimensional input device 123 (step 404), and processing the received inputs as appropriate to provide the various features directed by the viewer (step 406). Selection and providing of features may be repeated (step 410) on any regular, irregular or other basis. The steps of method 400 may take place in any other temporal order other than that shown in FIG. 4, and/or additional or alternate steps may be provided in alternate embodiments. The actual steps shown in FIG. 4 may be combined or omitted in still other embodiments.

Step 402 suitably involves presenting imagery 110 with one or more tiles 124 (e.g., tiles 124A-I in FIGS. 1 and 3). As noted above, each tile appropriately corresponds to one or more desired features provided by receiver 104; examples of such features include channel or program tuning, providing content associated with a network, channel, program, DVR, EPG, placeshifting feature, customer service feature, and/or the like. In various embodiments, tiles 124 are incorporated within any sort of imagery 110 generated by display processing module 218 and presented on display 102.

The viewer interacts with the presented tiles 124 in any manner. As noted above, in various embodiments the viewer provides inputs to receiver 104 using a remote control 112 that incorporates a two-dimensional input device 123 such as a touchpad, motion sensor, directional pad, joystick, trackball and/or the like. Signals 129 from remote control 112 provide receiver 104 with appropriate information to direct the position of cursor 114 on imagery 110, and to indicate viewer selections of tiles 124 as appropriate.

In response to the viewer selecting a tile 124, receiver 104 suitably provides the feature(s) associated with the selected tile in any manner (step 408). The particular features, as noted above, can vary significantly from embodiment to embodiment and tile to tile. Some features may include tuning to a selected channel or program, providing downloaded content, providing an interface for additional options (e.g., channel selection, placeshifting, recording, search, device configuration, preference selection and/or the like), or taking any other actions as appropriate. As noted above, the tiles 124 presented in imagery 110 may be configurable by the viewer in any manner, as may the features executed by one or more tiles 124. Accordingly, new systems and techniques are presented for graphically providing various features in a television receiver or the like using two-dimensional graphical interaction between the viewer and a tile or other feature presented on display 102.

As used herein, the word "exemplary" means "serving as an example, instance, or illustration." Any implementation described herein as exemplary is not necessarily to be construed as preferred or advantageous over other implementations.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

What is claimed is:

1. A method for graphically providing a plurality of features in a television receiver configured to present imagery on a display in response to viewer instructions received from a remote control, the method comprising:

receiving viewer instructions to select a customized set of tiles from a plurality of available tiles, wherein each of the plurality of available tiles is configured to be associated with one of the plurality of features, and wherein at least some of the plurality of available tiles activate functions of the television receiver, wherein each of customized set of tiles is a graphical image representing a function performed by the television receiver and wherein each of the customized set of tiles is selected by the viewer from the plurality of available tiles for inclusion in the customized set of tiles, wherein at least one of the plurality of available tiles activates a digital video recorder function of the television receiver, and wherein at least one of the customized set of tiles is associated with a television channel, wherein features that the tile associated with the television channel comprise causing the television channel to be tuned by the television receiver and causing program guide information for the television channel to be displayed based upon a user configuration of the tile associated with the television channel, and wherein a selection of the tile associated with the television channel causes the television channel to be tuned or the program guide information to be displayed based on the user configuration;

outputting the imagery for presentation on the display, wherein the imagery comprises the customized set of tiles;

receiving a subsequent viewer instruction from the remote control that indicates one of the customized set of tiles; and in response to the subsequent viewer instruction indicating one of the customized set of tiles, controlling the television receiver to thereby provide the particular user-selected feature associated with the indicated tile.

2. The method of claim 1 wherein the customized set of tiles is selected by the viewer by dragging selected tiles from the plurality of available tiles.

3. The method of claim 2 wherein the dragging comprises dragging selected tiles from a portion of the imagery that presents the plurality of available tiles to a separate portion of the imagery associated with the customized set of tiles.

4. The method of claim 1 wherein at least one of the customized set of tiles is associated with a feature that activates an electronic program guide function of the television receiver, wherein the tile associated with the function of the receiver controls a digital recorder function of the receiver, and wherein the tile associated with the electronic program guide function is presented in the same customized set of tiles as the tile associated with the digital video recorder function.

5. The method of claim 4 wherein at least one of the customized set of tiles is associated with feature that activates a placeshifting function of the television receiver, wherein the tile associated with the function of the receiver controls a digital recorder function of the receiver, and wherein the tile associated with the electronic program guide function is presented in the same customized set of tiles as the tile associated with the digital video recorder function.

6. The method of claim 1 wherein at least one of the customized set of tiles is associated with a feature that activates a customer service function of the television receiver, wherein the tile associated with the function of the receiver controls a digital recorder function of the receiver, and wherein the tile associated with the customer service function is presented in the same customized set of tiles as the tile associated with the digital video recorder function.

7. The method of claim 1 wherein at least one of the customized set of tiles is associated with a feature that plays back a program that has been downloaded to the television receiver, wherein the tile associated with the function of the receiver controls a digital recorder function of the receiver, and wherein the tile associated with the downloaded program is presented in the same customized set of tiles as the tile associated with the digital video recorder function.

8. The method of claim 1 further comprising receiving an instruction from a remote server to present the customized set of tiles as part of the imagery presented on the display.

9. The method of claim 1 further comprising identifying the selected one of the customized set of tiles based upon a position of a cursor that moves within the imagery presented on the display in response to viewer input signals received from the remote control.

10. A method for selecting a desired channel in a television receiver configured to present imagery on a display in response to viewer instructions transmitted from a remote control, the method comprising:

receiving viewer instructions to select a customized set of tiles from a plurality of available tiles, wherein each of the plurality of available tiles is configured to graphically represent one of a plurality of features provided by the television receiver, and wherein a first one of the plurality of available tiles is associated with a feature that activates a digital video recorder function on the television receiver and a second one of the plurality of available tiles is associated with the desired channel;

outputting the imagery for presentation on the display, wherein the imagery comprises the customized set of tiles selected by the viewer, and wherein the first one of the plurality of available tiles associated with the digital video recorder and the second one of the plurality of available tiles associated with the desired channel are simultaneously presented on the display in a common bank of tiles for viewer selection;

receiving an input from the remote control that graphically indicates a selected one of the customized set of tiles from the common bank of tiles;

in response to the received input indicating that the viewer has selected the tile associated with the desired channel, wherein features the tile associated with the desired channel comprise causing the desired channel to be tuned by the television receiver and causing program guide information for the desired channel to be displayed based upon a user configuration of the tile associated with the desired channel, controlling the television receiver to thereby present programming from the desired channel on the display or present program guide information for the desired channel on the display based on the user configuration of the tile associated with the desired channel; and in response to the received input indicating that the viewer has selected the tile associated with the digital video recorder function, controlling to the television receiver to thereby activate an interface that allows the viewer to control the digital video recorder.

11. The method of claim 10 wherein the channel number associated with the selected tile is configurable by the viewer.

12. A video receiver for presenting imagery on a display in response to viewer input signals provided from a remote control, the receiver comprising:

a receiver interface configured to receive an incoming modulated signal;

a decoder configured to decode the incoming modulated signal to extract a video signal;

a storage device configured to record at least some of the programs received with the video signal and thereby implement a digital video recorder function;

a wireless receiver configured to receive the viewer input signals from the remote control; and a processor configured provide graphical control over the receiving and presentation of the video signal in response to viewer graphical interaction with a customized set of tiles that are selected by the viewer from a plurality of available tiles, wherein each of the plurality of available tiles graphically represents one of a plurality of features provided by the video receiver, and wherein a first one of the plurality of available tiles is associated with the digital video recorder function of the video receiver, wherein a second one of the plurality of available tiles is associated with a television channel, and wherein the processor is further configured to generate the imagery output to the display for presentation, wherein the imagery comprises the customized set of tiles, and wherein the processor is further configured to receive the viewer input signals from the remote control, and, in response to the received input graphically indicating the tile representing the digital video recorder function of the video receiver, to change the imagery output to the display to include the interface associated with the digital video recorder function, and, in response to the received input graphically indicating the tile representing the television channel, wherein features the tile associated with the television channel comprise causing the television channel to be tuned by the television receiver and causing program guide information for the television channel to be displayed based upon a user configuration of the tile associated with the television channel, to change the imagery output to display either current programming on the television channel or program guide information for that television channel based on the user configuration of the tile representing the television channel.

13. The video receiver of claim 12 wherein the receiver interface comprises a satellite interface.

14. The video receiver of claim 12 wherein the receiver interface comprises a cable interface.

15. The video receiver of claim 12 wherein the wireless receiver is configured to receive the input signals from a wireless remote control comprising a two-dimensional input device.

16. The video receiver of claim 15 wherein the two-dimensional input device is a touchpad.

17. The video receiver of claim 12 wherein the processor is further configured to control the digital video recorder function in response to subsequent viewer input signals received from the remote control.

18. The video receiver of claim 12 wherein the processor is further configured to identify the selected one of the customized set of tiles based upon a position of a cursor that moves on the display in response to the viewer input signals.

19. The video receiver of claim 12 wherein the processor is configured to display both the programming and the program guide information, in response to the received input graphically indicating the tile representing the television channel, and wherein whether the processor displays the programming or the program guide information is user-configurable.

20. The video receiver of claim 19 wherein a third one of the plurality of available tiles is associated with a further television channel, wherein selection of the tile associated with the further television channel causes an RSS feed to be displayed.

* * * * *